(12) United States Patent
Monis et al.

(10) Patent No.: US 7,682,255 B2
(45) Date of Patent: Mar. 23, 2010

(54) COMPENSATOR ASSEMBLY FOR A MOTORCYCLE PRIMARY DRIVE

(75) Inventors: Karl W. Monis, Rubicon, WI (US);
James R. Pepper, Waukesha, WI (US);
Andy J. Bingen, Lomira, WI (US); John W. Schanz, Germantown, WI (US);
Nathan R. Waas, Lomira, WI (US);
Thomas A. Lanser, Hartland, WI (US);
Rick A. Schmidt, Menomonee Falls, WI (US); Jeffrey D. Dickau, Hartford, WI (US); Wayne G. Farvour, Colgate, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 304 days.

(21) Appl. No.: 11/771,334

(22) Filed: Jun. 29, 2007

(65) Prior Publication Data
US 2009/0005181 A1    Jan. 1, 2009

(51) Int. Cl.
*F16D 3/10* (2006.01)
(52) U.S. Cl. .................... 464/161; 123/192.1
(58) Field of Classification Search ............ 464/38, 464/39, 161; 123/192.1; 474/94
See application file for complete search history.

(56) References Cited

U.S. PATENT DOCUMENTS

| 782,473 A * | 2/1905 | Urtel et al ............... 464/161 |
| 1,349,082 A * | 8/1920 | Middleton ............ 464/161 X |
| 4,328,879 A | 5/1982 | Tone |
| 4,332,574 A | 6/1982 | Aoyama et al. |
| 4,373,924 A * | 2/1983 | Schuhmacher ............ 464/38 |
| 4,486,183 A | 12/1984 | Posiviata et al. |
| 4,794,998 A | 1/1989 | Iwai et al. |
| 5,341,780 A | 8/1994 | Rau et al. |
| 6,113,457 A | 9/2000 | Kociemba |
| 6,234,909 B1 | 5/2001 | Yetzke |
| 6,352,243 B1 * | 3/2002 | Samejima ............. 464/38 X |
| 6,516,912 B2 | 2/2003 | Iwai et al. |
| 6,688,986 B2 | 2/2004 | Hojyo et al. |
| 7,143,734 B1 | 12/2006 | Leppanen et al. |
| 2002/0165053 A1 | 11/2002 | Kimura et al. |
| 2006/0094547 A1 | 5/2006 | Xu et al. |
| 2006/0172832 A1 | 8/2006 | Watanabe et al. |

OTHER PUBLICATIONS

Fig. A illustrates an admitted prior art compensator assembly.
Fig. B illustrates an admitted prior art compensator assembly.

* cited by examiner

*Primary Examiner*—Greg Binda
(74) *Attorney, Agent, or Firm*—Michael Best & Friedrich LLP (57) ABSTRACT

A compensator assembly for transmitting torque from a crankshaft of an engine to a clutch in a motorcycle drive train. The compensator assembly includes a cam slider, a sprocket, and a spring pack biasing the cam slider into engagement with the sprocket. The spring pack includes multiple springs having different spring rates. The cam slider includes first and second dissimilar cam members. A retainer is coupled to the crankshaft and formed with an anti-rotation feature engageable to hold the retainer, the cam slider, and the crankshaft stationary during tightening of a retaining bolt. The sprocket includes a plurality of spokes and axial openings. At least a portion of the cam slider extends through one of the plurality of axial openings.

24 Claims, 10 Drawing Sheets

COMPENSATOR ASSEMBLY FOR A MOTORCYCLE PRIMARY DRIVE

BACKGROUND

The present invention relates to a compensator assembly for a motorcycle primary drive between a crankshaft and a clutch. The compensator assembly dampens impulse loads during the delivery of torque between the crankshaft and the clutch.

SUMMARY

In one embodiment, the invention provides a compensator assembly for transmitting torque from a crankshaft of an engine to a clutch in a motorcycle drive train. The compensator assembly includes a cam slider mounted on a first end of the crankshaft, the cam slider being configured to rotate with the crankshaft about a crankshaft axis. The compensator assembly includes a sprocket mounted on the first end of the crankshaft adjacent the cam slider, wherein the sprocket is rotatable relative to the crankshaft and the cam slider about the crankshaft axis. A first spring is mounted on a first side of the cam slider opposite the sprocket, the first spring being operable to bias the cam slider toward the sprocket. A second spring is mounted on the first side of the cam slider, the second spring being operable to bias the cam slider toward the sprocket. The second spring has a spring rate substantially lower than a spring rate of the first spring.

In another embodiment, the compensator assembly includes a cam slider mounted on a first end of the crankshaft, the cam slider including a pair of cam members and being configured to rotate with the crankshaft about a crankshaft axis. A sprocket mounted on the first end of the crankshaft adjacent the cam slider includes a cam member engageable by the pair of cam members of the cam slider. The sprocket is rotatable relative to the crankshaft and the cam slider about the crankshaft axis. At least one spring is mounted on a first side of the cam slider opposite the sprocket, the spring being operable to bias at least one of the pair of cam members of the cam slider into contact with the cam member of the sprocket. The pair of cam members includes a first cam member operable to transmit torque from the crankshaft to the clutch and a second cam member, dissimilar from the first cam member, operable to transmit torque from the clutch to the crankshaft.

In yet another embodiment, the compensator assembly includes a cam slider and a sprocket mounted on the first end of the crankshaft. A spring pack is mounted on a first side of the cam slider opposite the sprocket and is operable to bias the cam slider toward the sprocket. A retainer is configured to be coupled to the crankshaft to rotate therewith. The retainer is formed with an anti-rotation feature. A bolt is configured to pass through the retainer and engage the crankshaft. The anti-rotation feature of the retainer is engageable to hold the retainer, the cam slider, and the crankshaft stationary during tightening of the bolt.

In yet another embodiment, the compensator assembly includes a cam slider and a sprocket mounted on a first end of the crankshaft, the cam slider being configured to rotate with the crankshaft about a crankshaft axis. The cam slider includes a cam member extending between a peak and a base surface. The sprocket includes a plurality of spokes, wherein one of the plurality of spokes engages the cam member of the cam slider. The sprocket further includes a plurality of axial openings, wherein the peak extends through one of the plurality of axial openings. At least one spring is mounted on a first side of the cam slider opposite the sprocket, the at least one spring being operable to bias the cam slider toward the sprocket.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
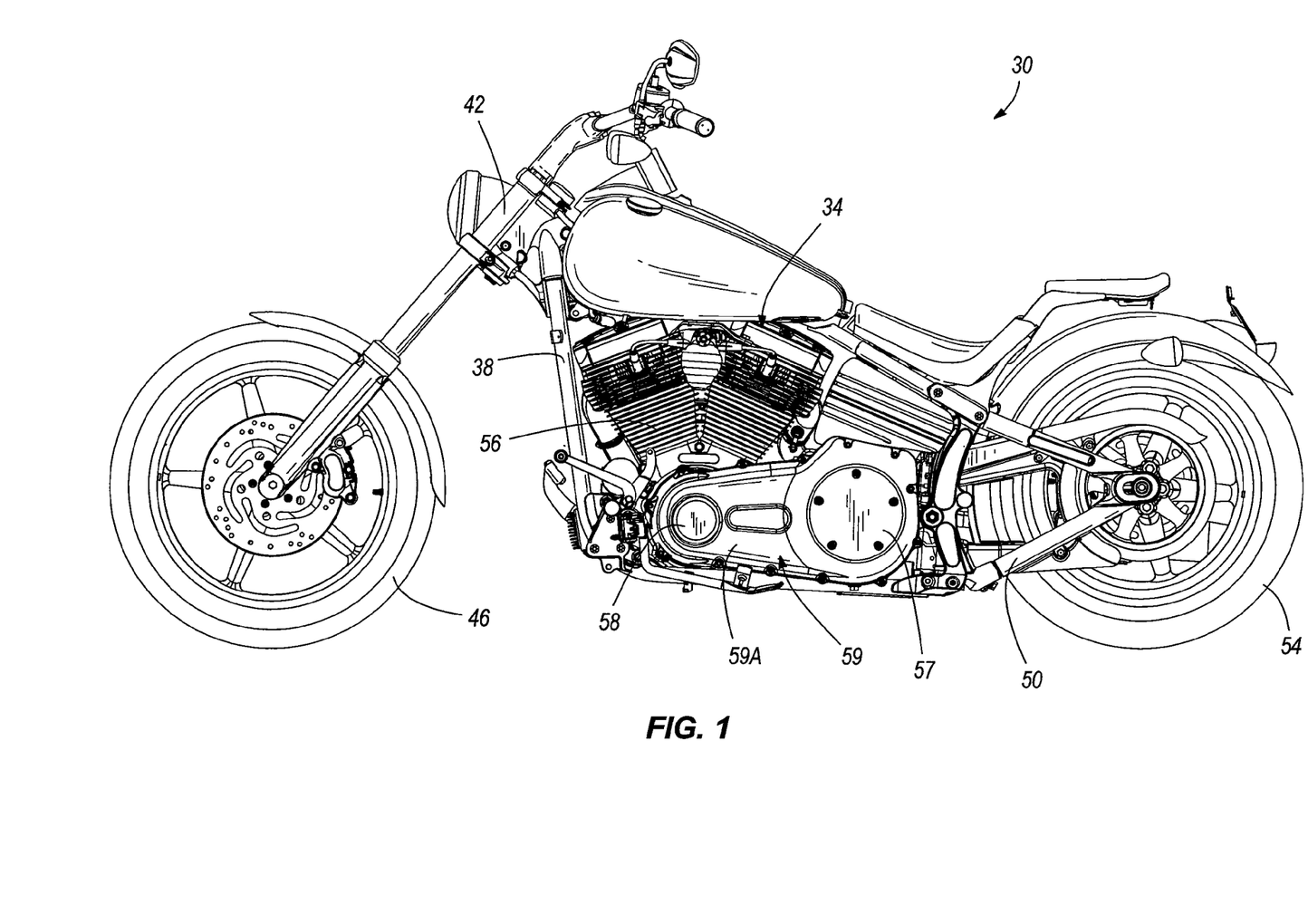
FIG. 1 is a side view of a motorcycle including a primary drive assembly embodying the present invention.

FIG. 1 illustrates a motorcycle 30 including an internal combustion engine assembly 34 embodying the invention. The motorcycle 30 includes a frame 38, a steering assembly 42 pivotally coupled to a forward portion of the frame 38, and a front wheel 46 rotatably coupled to the steering assembly 42. A swingarm 50 is pivotally coupled to a rearward portion of the frame 38 and a rear wheel 54 is rotatably coupled to the swingarm 50. An engine 56 of the engine assembly 34 provides power and torque to drive the rear wheel 54 through a clutch 57 as discussed in further detail below.

Figure 2:
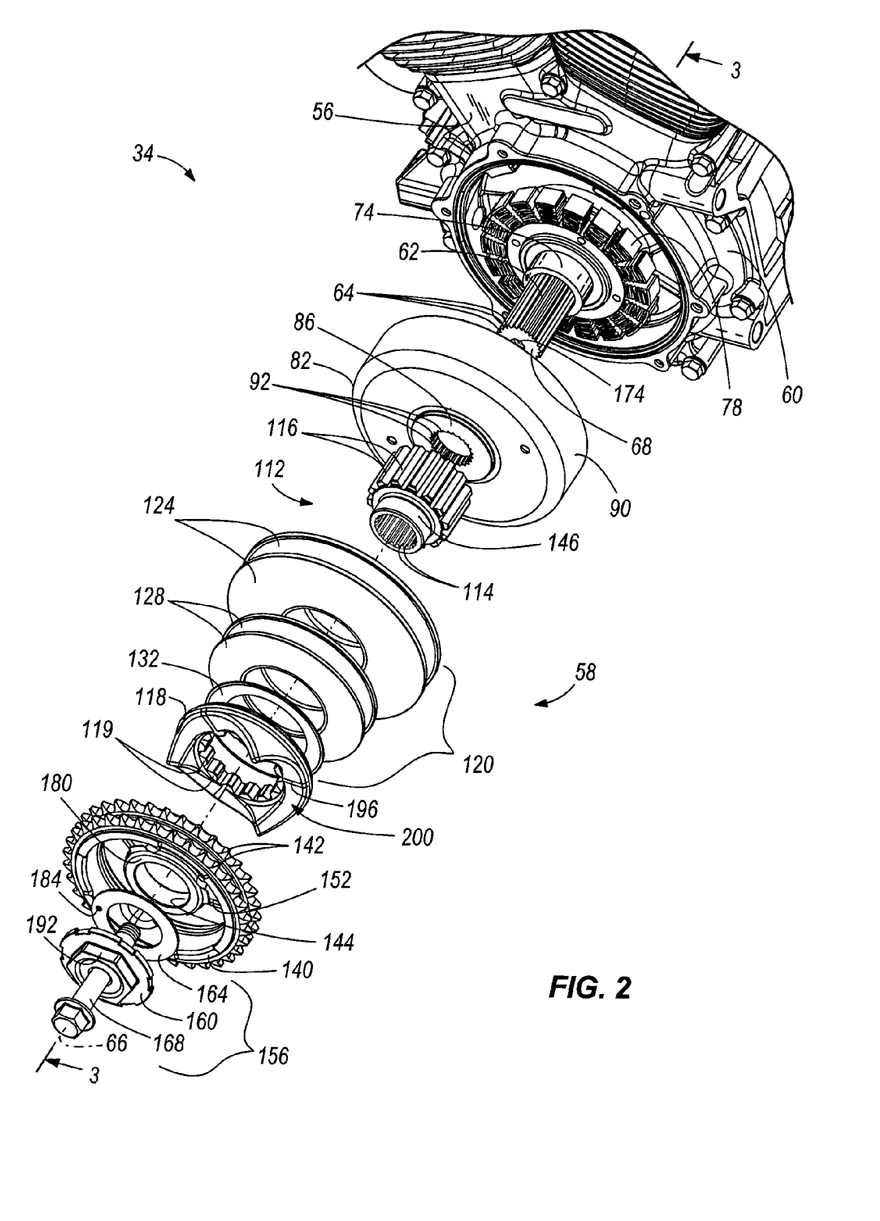
FIG. 2 is an exploded assembly view of a compensator assembly of the primary drive assembly of FIG. 1.
Figure 3:
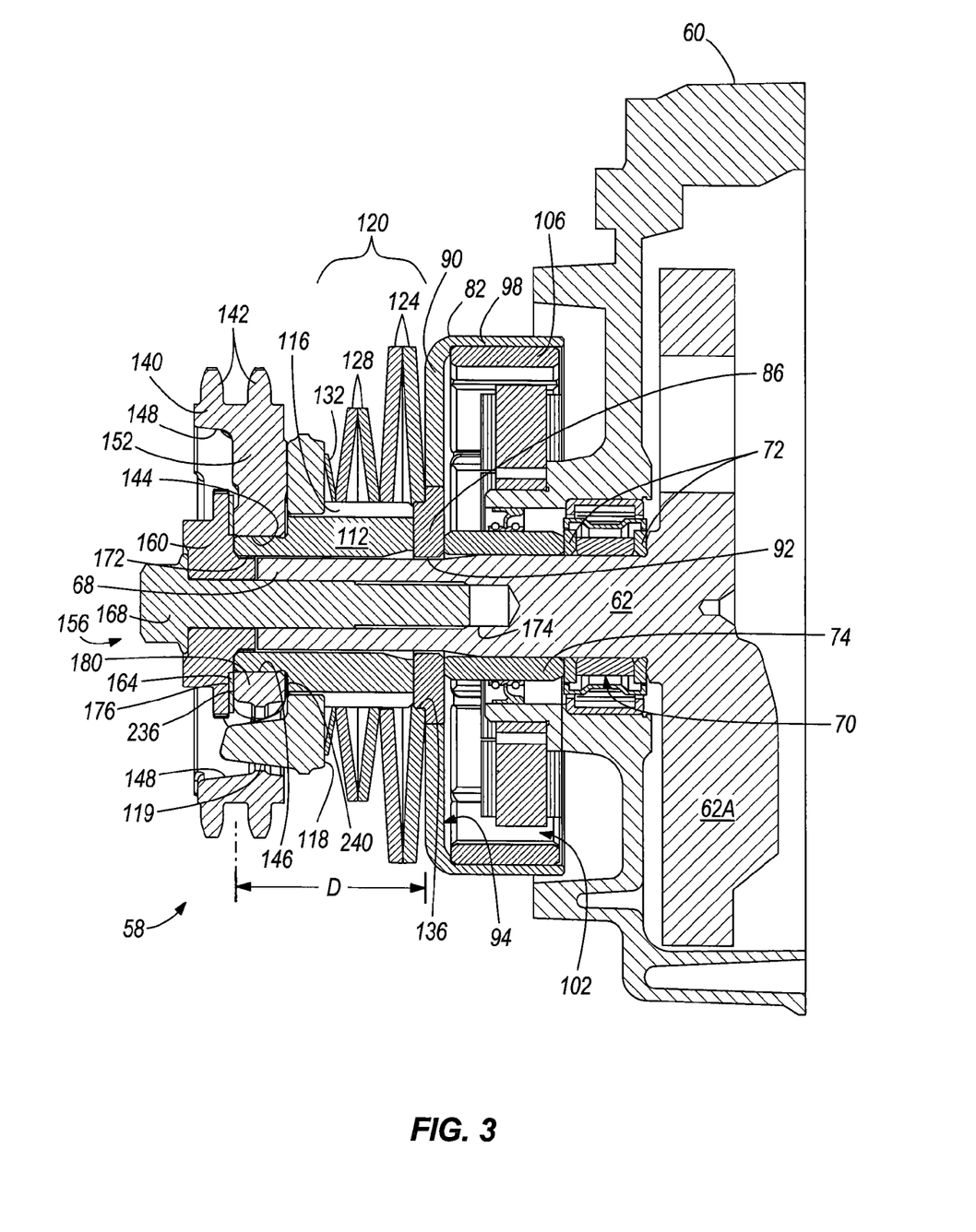
FIG. 3 is a cross-section view of the compensator assembly taken along line 3-3 of FIG. 2.

As illustrated in FIGS. 2 and 3, the engine assembly 34 includes a compensator assembly 58, which is part of a primary drive assembly or "primary drive" 59 between the engine 56 and the clutch 57. A primary housing 59A (FIG. 1) at least partially encloses the compensator assembly 58 and the clutch 57 along with a quantity of lubricant. The engine assembly 34 further includes a crankcase 60 (FIGS. 2 and 3), which supports a crankshaft 62 and a flywheel 62A for rotation about a crankshaft axis 66. A first end 68 of the crankshaft 62 extends outwardly from the crankcase 60 (the crankcase 60 is not shown in FIG. 3) and includes one or more spline teeth 64. As shown in FIG. 3, the crankshaft 62 is supported for rotation by a bearing 70 (including thrust washers 72) that is pressed into the crankcase 60. A spacer 74 abuts the bearing 70 and properly positions the compensator assembly 58 along the crankshaft axis 66 in relation to the engine 56 and the crankcase 60. As shown in FIG. 2, the crankcase 60 also supports an alternator stator 78 positioned axially outwardly of the crankcase 60 and concentrically aligned with the crankshaft axis 66.

The compensator assembly 58 is coupled for rotation with the crankshaft 62 and operates to dampen impulse loads between the engine 56 and the rear wheel 54 during operation of the motorcycle 30 (as described in further detail below). The compensator assembly 58 includes a hub in the form of a housing 82 that is coupled for rotation with the crankshaft 62. The housing 82 (shown in FIGS. 2 and 3) includes a carrier hub 86 and a rotor shell 90. The carrier hub 86 is formed with one or more internal spline teeth 92 that engage the external spline teeth 64 of the crankshaft 62. The carrier hub 86 is made of steel and welded to the rotor shell 90, although the two parts of the housing 82 can be coupled by alternate means. The carrier hub 86 is heat-treated for increased durability at least in the region of the spline teeth 92.

The rotor shell 90 defines an annular first housing surface 94 that faces the crankcase 60. The rotor shell 90 also includes a generally cylindrical wall 98 that cooperates with the first housing surface 94 to define a first chamber 102 that opens toward the crankcase 60. An alternator rotor 106 is coupled to the cylindrical wall 98 and is positioned within the first chamber 102. The alternator rotor 106 rotates around the alternator stator 78 during engine operation to generate electrical power for an electrical system of the motorcycle 30.

A shaft extension or collar 112 is coupled to the first end 68 of the crankshaft 62 to rotate therewith. As shown in FIG. 2, the collar 112 includes an internal spline having one or more spline teeth 114 that engage the external spline teeth 64 of the crankshaft 62. As shown in FIGS. 2 and 3, the collar 112 also includes an external spline having one or more spline teeth 116 that are configured to support additional components of the compensator assembly 58. A cam slider 118 is supported on the collar 112 and includes an internal spline having one or more spline teeth 119 engaged with the external spline teeth 116 of the collar 112 so that the cam slider 118 rotates synchronously with the collar 112 and the crankshaft 62. The external spline teeth 116 are chamfered on the end of the collar 112 to facilitate assembly by centering the cam slider 118 with the collar 112 without reducing the face width (engagement) of the spline teeth 116.

A spring pack 120 is supported by the collar 112 between the cam slider 118 and the housing 82. The spring pack 120 includes a first spring pair having two substantially identical first springs 124, a second spring pair having two substantially identical second springs 128, and a third or "pre-load" spring 132 that is smaller than the first and second springs 124, 128. In the illustrated embodiment, the first springs 124, the second springs 128, and the pre-load spring 132 are Belleville springs.

The pre-load spring 132 has a spring rate and an outer diameter respectively smaller than a spring rate and outer diameter of either one of the second springs 128. The spring rate and outer diameter of either one of the second springs 128 are respectively smaller than a spring rate and outer diameter of either one of the first springs 124. The spring rates of the springs 124, 128, 132 increase with an increase in thickness and decrease with an increase in outer diameter (with a constant inner diameter). Either one of the first springs 124 has a thickness greater than a thickness of either one of the second springs 128. The thickness of either one of the second springs 128 is greater than a thickness of the pre-load spring 132. The first springs, second springs, and pre-load spring 124, 128, 132 have substantially equal inner diameters. The first spring 124 nearest the housing 82 is supported at its inner diameter by a support surface 136 (FIG. 3) of the carrier hub 86. The first spring 124 directly adjacent the pair of second springs 128, both the second springs 128, and the pre-load spring 132 are supported at their respective inner diameters by the external spline teeth 116 of the collar 112, which can be fully or partially constructed of hardened steel. The springs 124, 128, 132 supported by the collar 112 are not splined to the collar 112, but rather rest upon the segmented outer circumferential surface formed by the external spline teeth 116.

Axially adjacent the cam slider 118 is a sprocket 140 supported on the collar 112. In the illustrated embodiment, the sprocket 140 includes two axially-spaced rings of sprocket teeth 142. During driving operation of the motorcycle 30, the sprocket 140 is configured to be driven by the cam slider 118 and is further configured to drive the rear wheel 54 through the clutch 57. A chain (not shown) such as a double-row chain is coupled to the sprocket 140 and to a corresponding input sprocket (not shown) of the clutch 57. In some embodiments, the sprocket 140 is configured to engage one or more gears, a drive belt, or the like instead of a chain. The sprocket 140 is not internally splined, but rather includes a bore 144 rotatably supported on a smooth support surface 146 located at the outward end (away from the engine 56) of the collar 112, as shown in FIG. 3. Therefore, the sprocket 140 is rotatable relative to the cam slider 118, the collar 112, and the crankshaft 62 about the crankshaft axis 66 within a predetermined range.

The support surface 146 of the collar 112 has a smaller diameter than the minor or root diameter of the external spline teeth 116. Due in part to the collar 112 not being utilized to axially retain any of the sprocket 140, the cam slider 118, or the spring pack 120, the external spline teeth 116 constitute the largest diameter of the collar 112. Thus, the external spline teeth 116 can be machined by hobbing, rather than the less desirable shaping operation, which would have to be used if the collar 112 included a flange with an outer diameter larger than the external spline teeth 116.

Figure 7:
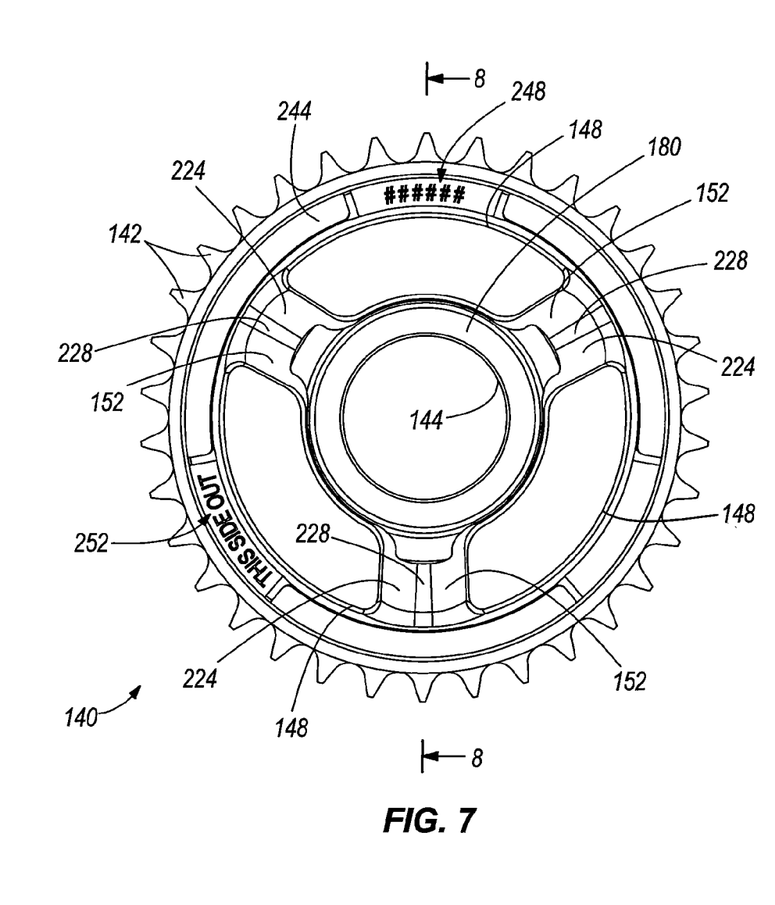
FIG. 7 is a side view of a sprocket of the primary drive assembly of FIG. 1.
Figure 8:
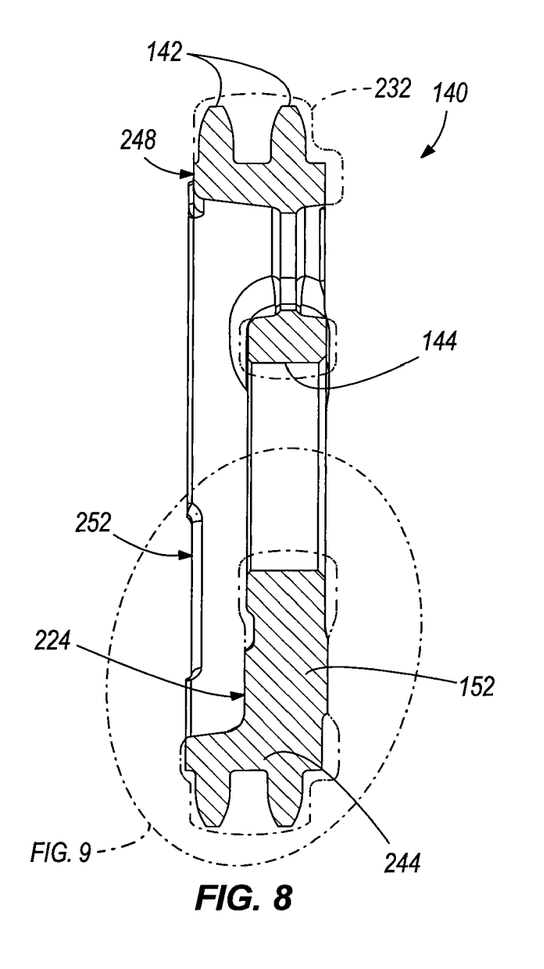
FIG. 8 is a cross-section view of the sprocket taken along line 8-8 of FIG. 7.
Figure 9:
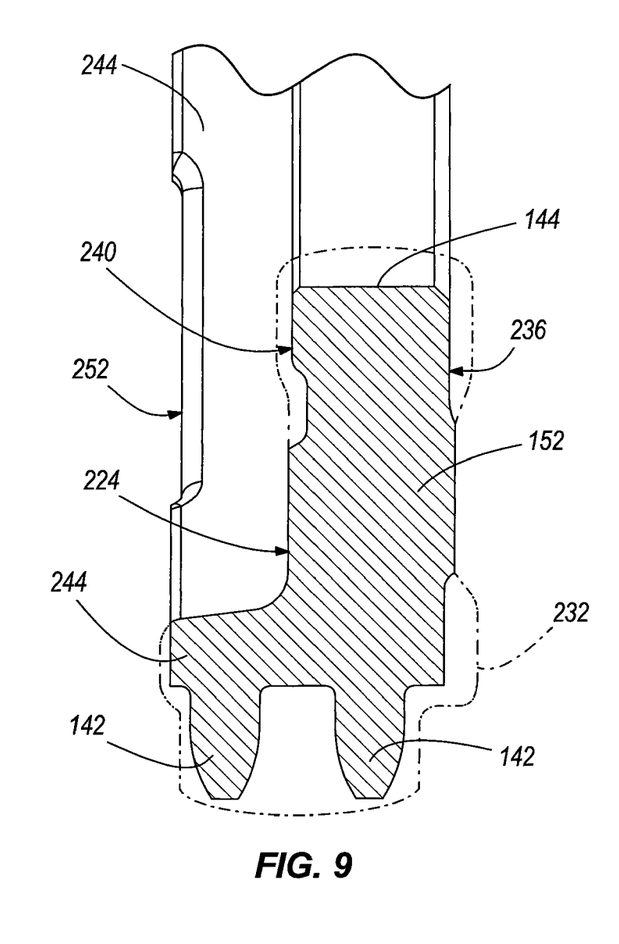
FIG. 9 is a detail view of a portion of the sprocket shown in FIG. 8.

As best shown in FIGS. 7-9, the sprocket 140 includes axial openings 148 separated by spokes 152, which are generally radially-extending. In the illustrated embodiment, the sprocket 140 includes three axial openings 148 and three radial spokes 152. The axial openings 148 allow the cam slider 118 to rest substantially within the sprocket 140 and partially within the axial openings 148 at a neutral state of the compensator assembly 58. The axial openings 148 also allow lubricant within the primary housing 59A to pass through the sprocket 140 and lubricate the compensator assembly 58 (e.g., by splash lubrication), particularly the interface between the cam slider 118 and the sprocket 140.

Figure 11:
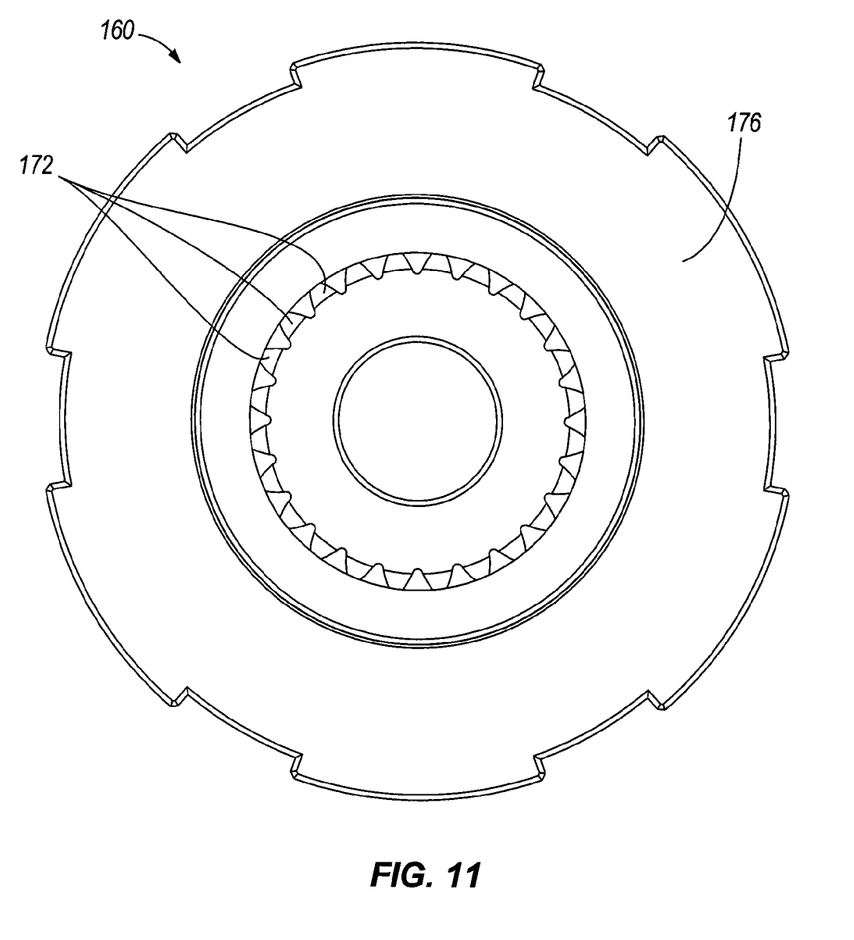
FIG. 11 is a side elevation view of a retainer shown in FIGS. 2 and 3.

As shown in FIGS. 2 and 3, the compensator assembly 58 further includes a retainer assembly 156 having a retainer 160, a thrust washer 164, and a bolt 168. The retainer 160 includes one or more external spline teeth 172 which engage the internal spline teeth 114 of the collar 112. Thus, the retainer 160 is rotationally locked with the collar 112, the cam slider 118, and the crankshaft 62. The bolt 168 is threaded into an opening 174 in the first end 68 of the crankshaft 62. The thrust washer 164 is positioned axially between a retainer surface 176 of the retainer 160 and an inner rim 180 of the sprocket 140. The thrust washer 164 is formed with an opening 184, which is configured to receive a corresponding pin (not shown), which may extend from the retainer 160 to co-orient the retainer 160 and thrust washer 164 in a predetermined orientation and hold the thrust washer 164 in place during assembly. As shown in FIG. 11, the retainer 160 is provided without a pin in some embodiments. In some embodiments, a bonding material between the retainer 160 and the thrust washer 164 enables the retainer 160 and the thrust washer 164 to be handled and assembled as a sub-assembly.

The thrust washer 164 is constructed of or coated with a low friction material so that the compensator assembly 58 can be held together with a substantial axial force via the bolt 168 (the axial force increasing as the springs 124, 128, 132 are compressed) while allowing the sprocket 140 to slide on the thrust washer 164 during rotation relative to the retainer assembly 156 and the collar 112. In some embodiments, the thrust washer is constructed of Teflon®-impregnated and/or Teflon®-coated metal, such as bronze. In some embodiments, the thrust washer is constructed of Permaglide® material available from INA (Herzogenaurach, Germany).

As best shown in FIG. 2, the retainer 160 is formed to include an axially-extending boss 192. In the illustrated embodiment, the head of the bolt 168 is partially recessed within the boss 192, but such a construction may be altered in various embodiments. As shown in FIG. 2, the boss 192 has a hexagonal cross-sectional shape including six equal-length flat sides. The boss 192 is of a standardized size such that an English or metric wrench (not shown) may be used to engage the boss 192. In other embodiments, the retainer 160 includes at least one feature (not necessarily a boss 192 having six equal-length flat sides) configured to be grasped or locked to hold the retainer 160 (and the crankshaft 62) against rotation as desired. The feature can include a socket (larger than the head of the bolt 168), spaced-apart holes, or virtually any non-round outer surface of the boss 192, for example.

During assembly of the compensator assembly 58, the bolt 168 is tightened into the opening 174 in the crankshaft 62 so that the compensator assembly 58 includes a stack up of compressed components between the flywheel 62A and the head of the bolt 168 that all rotate together (including but not limited to the retainer 160, the collar 112, the hub 86, the spacer 74, and at least an inner race of the bearing 70). As the head of the bolt 168 becomes engaged with the retainer 160, the retainer 160 (and with it the collar 112 and the crankshaft 62) is urged by friction to rotate with the bolt 168. Also, the threaded engagement between the bolt 168 and the crankshaft 62 tends to directly urge the crankshaft 62 to rotate with the bolt 168 rather than allowing the bolt 168 to be securely tightened into the opening 174. The boss 192 provides a convenient location to engage a tool during assembly of the retainer assembly 156 to rotationally fix the crankshaft 62 during tightening of the bolt 168. This makes the installation of the bolt 168 simpler and more accurate because the assembly torque on the bolt 168 is directly applied to the joint at the opening 174 without relying on the torque being transmitted through the resilient connection between the cam slider 118 and the sprocket 140, which is described in further detail below. Furthermore, the spline connection between the retainer 160 and the collar 112 (and in turn, the crankshaft 62) keeps the retainer 160 from rotating relative to the bolt 168, which can potentially cause the bolt 168 to become loosened or "back out" of the opening 174.

Figure 4:
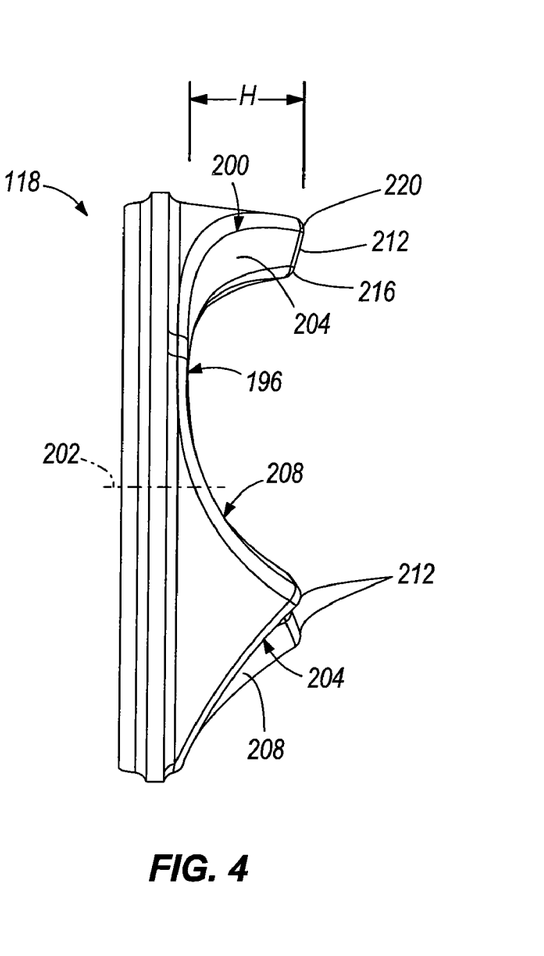
FIG. 4 is a rear elevation view of a cam slider of the compensator assembly of FIG. 2.
Figure 5:
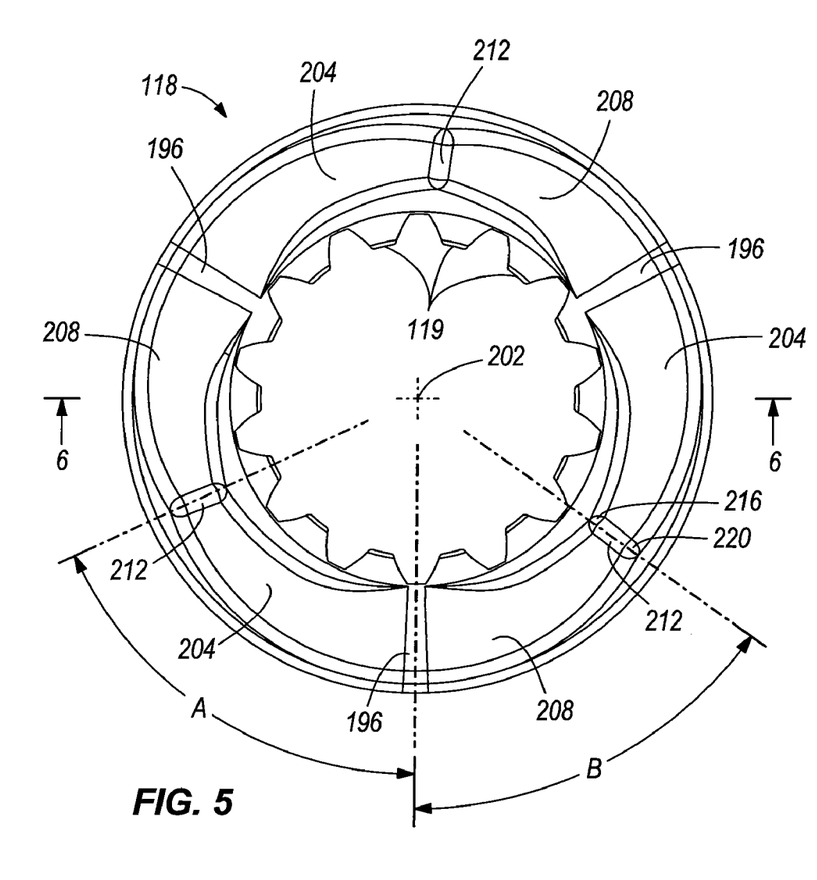
FIG. 5 is a side elevation view of the cam slider of FIG. 4.

As illustrated in FIGS. 2 and 4-6, the cam slider 118 includes a base surface 196 facing toward the sprocket 140. A cam surface 200 is formed on the cam slider 118, extending axially from the base surface 196 to different heights depending on the circumferential location along the cam slider 118. The cam slider 118 defines an axis 202 that is coincident with the crankshaft axis 66 when the compensator assembly 58 is assembled. The cam surface 200 includes at least one pair of cam members or cam profiles 204, 208 (the illustrated cam surface 200 including three pairs of cam profiles 204, 208). The first cam profile 204 extends from the base surface 196 to a peak, such as a peak edge 212, which constitutes the maximum height H of the cam surface 200 measured from the base surface 196. The second cam profile 208 extends from the base surface 196 to a second peak edge 212 of the same height H. The second cam profile 208 is steeper than the first cam profile 204 as it extends to the same height H axially beyond the base surface 196 over a shorter circumferential segment of the cam slider 118. For example, the first cam profile 204 can extend along an angle A of about 65 degrees about the axis 202, and the second cam profile 208 can extend along an angle B of about 55 degrees about the axis 202 (FIG. 5).

Figure 6:
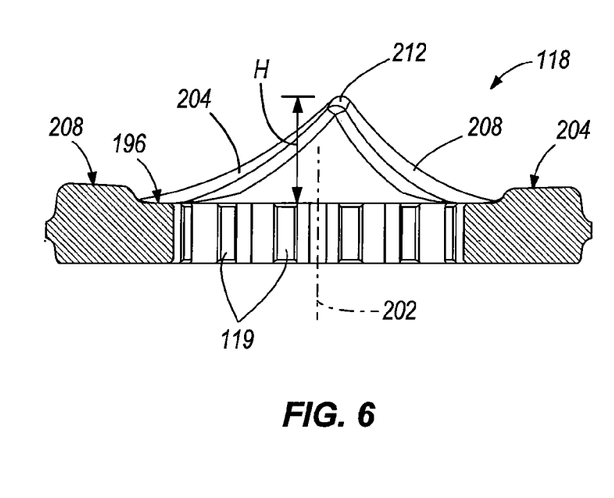
FIG. 6 is a cross-section view of the cam slider taken along line 6-6 of FIG. 5.

Each pair of cam profiles 204, 208 extends between adjacent peak edges 212 at which location it meets the adjacent pairs of cam profiles 204, 208. All the first cam profiles 204 are substantially identical, and all the second cam profiles 208 are substantially identical. Each one of the spokes 152 of the sprocket 140 is configured to engage only one pair of cam profiles 204, 208 of the cam surface 200 as described in further detail below. As illustrated in FIGS. 4 and 6, each peak edge 212 includes a radially inner end 216 and a radially outer end 220. The inner end 216 is slightly closer to the base surface 196 of the cam slider 118 than the outer end 220. Therefore, the peak edges 212 and all the cam profiles 204, 208 are banked slightly toward the crankshaft axis 66 and toward the base surface 196. This orientation of the cam surface 200 as a whole is configured to maintain line contact (rather than point contact) with the respective spokes 152 of the sprocket 140 and also causes the sprocket 140 to be naturally centered upon axial compression between the cam slider 118 and the sprocket spokes 152.

Each spoke 152 of the sprocket 140 (FIGS. 7-9) is a cam member and includes a cam follower surface 224 configured to selectively engage one of the pairs of cam profiles 204, 208 of the cam surface 200 on the cam slider 118. The cross-sectional shape of the spokes 152 is not perfectly circular, but rather oblong with a flattened portion 228. Furthermore, the spokes 152 are shaped such that the cam follower surfaces 224 remain in surface contact or line contact, rather than point contact, with the cam surface 200 of the cam slider 118.

As shown in FIGS. 8 and 9 by the phantom outline 232, the sprocket 140 can be machined to its final shape from a blank, such as a blank forging or casting. The sprocket teeth 142 and the bore 144 are machined after the blank is created. Furthermore, identical blanks can be machined to include various drive features (e.g., sprocket teeth 142, belt drive elements, gear teeth, etc.) Axially-facing surfaces 236, 240 (FIG. 9) of the inner rim 180 that contact the thrust washer 164 and the collar 112/cam slider 118, respectively as shown in FIG. 3 are also machined after the blank is created. As shown in FIG. 7, the sprocket 140 includes an outer rim 244 having markings including a part number marking 248 and a "THIS SIDE OUT" marking 252, both of which can be formed during creation of the blank. The blank can also be formed to include similar markings (not shown) on an opposite side of the outer rim 244. The part number on the opposite side differs from that of the part number marking 248. During machining of the blank, the outer rim 244 is machined to remove material from the outer rim 244 and to remove the markings from one side, leaving the markings 248, 252 on the other side. Once machined, the sprocket 140 is configured to provide a predetermined axial offset distance D (FIG. 3) from the housing 82 to the sprocket teeth 142. The same blank that is used to create the illustrated sprocket 140 with the offset distance D can be machined differently (to remove the markings 248, 252) and installed in the opposite orientation from that shown in FIGS. 2 and 3 to provide a different offset distance. Thus, the compensator assembly 58 is easily modified for use on different motorcycles or engines having different offset requirements.

Figure 12:
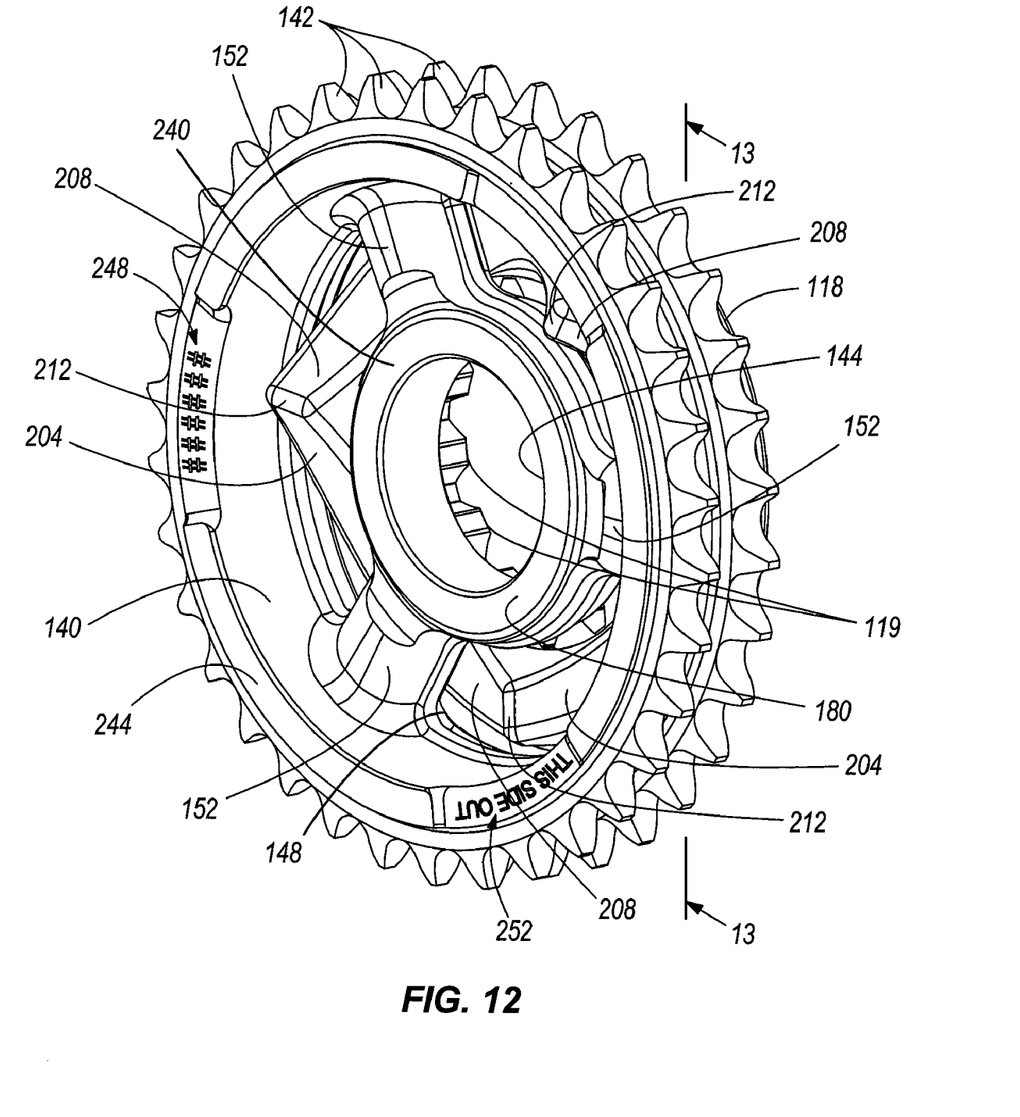
FIG. 12 is a perspective view of the cam slider of FIGS. 4-6 and the sprocket of FIGS. 7-9.
Figure 13:
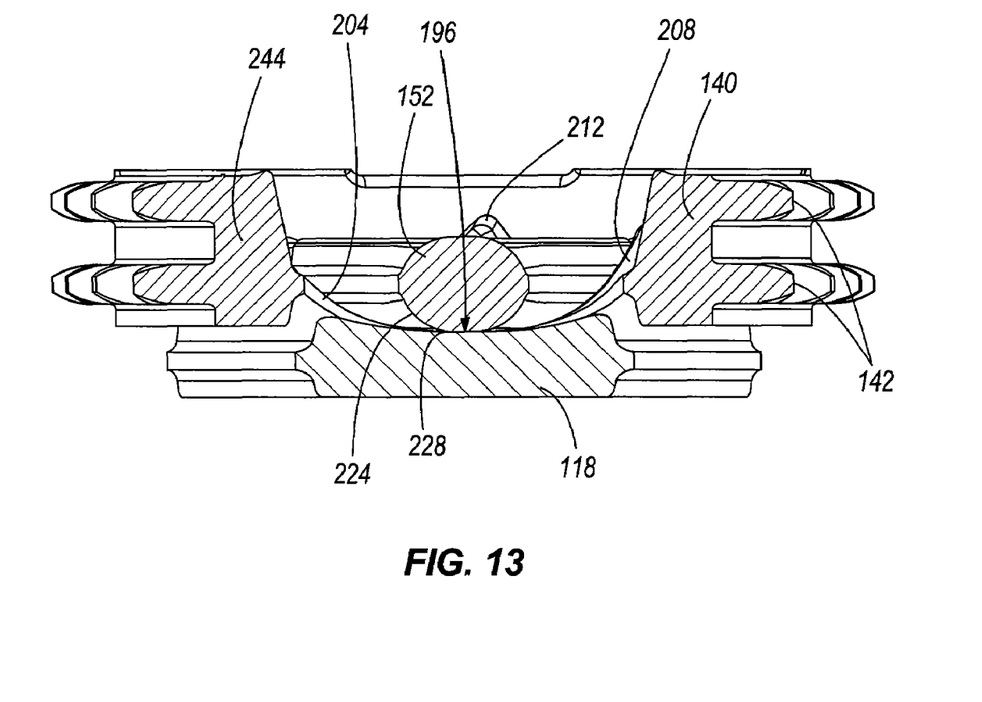
FIG. 13 is a cross-section view of the cam slider and the sprocket taken along line 13-13 of FIG. 12.

During operation of the motorcycle 30, the power generated by the engine 56 turns the crankshaft 62. The torque at the crankshaft 62 is transmitted directly to the collar 112 and the cam slider 118. The torque at the cam slider 118 is transmitted resiliently to the sprocket 140 so that impact loads are dampened prior to reaching the clutch 57 (and corresponding transmission), which selectively provides torque to the rear wheel 54. In a neutral state of the compensator assembly 58, the cam follower surface 224 of the sprocket 140 is rotationally aligned and engaged with the base surface 196 of the cam slider 118 and not with the cam profiles 204, 208. The pre-load spring 132 provides the axial biasing force to press the cam slider 118 and the sprocket 140 together. Because the pre-load spring 132 is far less stiff than the first and second springs 124, 128, the pre-load spring 132 is compressed to a flat or nearly flat state while the first and second springs 124, 128 remain neutral, experiencing very little deflection or substantially none at all. As shown in FIGS. 12 and 13, the cam profiles 204, 208 of the cam slider 118 extend into the axial openings 148 in the sprocket 140, and in some embodiments, the peak edges 212 extend fully through the axial openings 148. The nesting of the cam slider 118 into the sprocket 140 in this manner allows for a narrower compensator assembly 58 (along the crankshaft axis 66) and/or greater axial clearance between the cam slider 118 and the housing 82 (allowing greater flexibility in configuration of the spring pack 120, among other things).

With an increase in torque at the crankshaft 62 (e.g., during acceleration), the collar 112 drives the cam slider 118 synchronously, which in turn drives the sprocket 140 through the resilient interface of the compensator assembly 58. The first cam profiles 204 on the cam slider 118 engage the cam follower surfaces 224 of the spokes 152. The sprocket 140 is substantially fixed in position axially so that the entire cam slider 118 moves axially toward the housing 82. The spline teeth 119 of the cam slider slide along the spline teeth 116 of the collar 112. The amount of axial travel of the cam slider 118 against the force of the spring pack 120 depends on the torque that is present at the crankshaft 62 (e.g., overall amount, impulse or jerk, etc.). Smaller amounts of torque and torque impulse result in minimal deflection of the spring pack 120 and minimal travel of the cam follower surfaces 224 up the first cam profiles 204, while larger amounts of torque and torque impulse result in greater deflection of the spring pack 120 and travel of the cam follower surfaces 224 closer to the peak edges 212 of the cam surface 200. As a whole, the compensator assembly 58 does not prevent torque from being transmitted to the clutch 57, but rather it delays and smoothes out the delivery of torque from the crankshaft 62 to the clutch 57.

The compensator assembly 58 is bi-directional, and as such is operable to provide compensation in a "back-drive" direction-when the net torque output from the crankshaft 62 to the clutch 57 is suddenly decreased or becomes negative (e.g., during deceleration of the motorcycle 30, shifting of the transmission, starting of the engine 56, etc.). Under these circumstances, the cam follower surfaces 224 of the sprocket 140 engage the second cam profiles 208 on the cam slider 118. The transmission of torque is delayed and smoothed between the sprocket 140 and the crankshaft 62. The cam surface 200 is asymmetrical, the second cam profiles 208 being steeper than the first cam profiles 204 to provide a less gradual absorption of torque impulses against the bias of the spring pack 120. As a result, the compensator assembly 58 provides a maximum relative rotation between the sprocket 140 and the cam slider 118 in the back-drive direction that is less than a maximum relative rotation between the sprocket 140 and the cam slider 118 in the normal drive direction. This keeps the compensator assembly 58 from bottoming out (i.e., fully-compressing the spring pack 120) and producing undesirable noise when the crankshaft 62 is driven by the sprocket 140 of the primary drive 59 (e.g., during engine starting).

Figure 10:
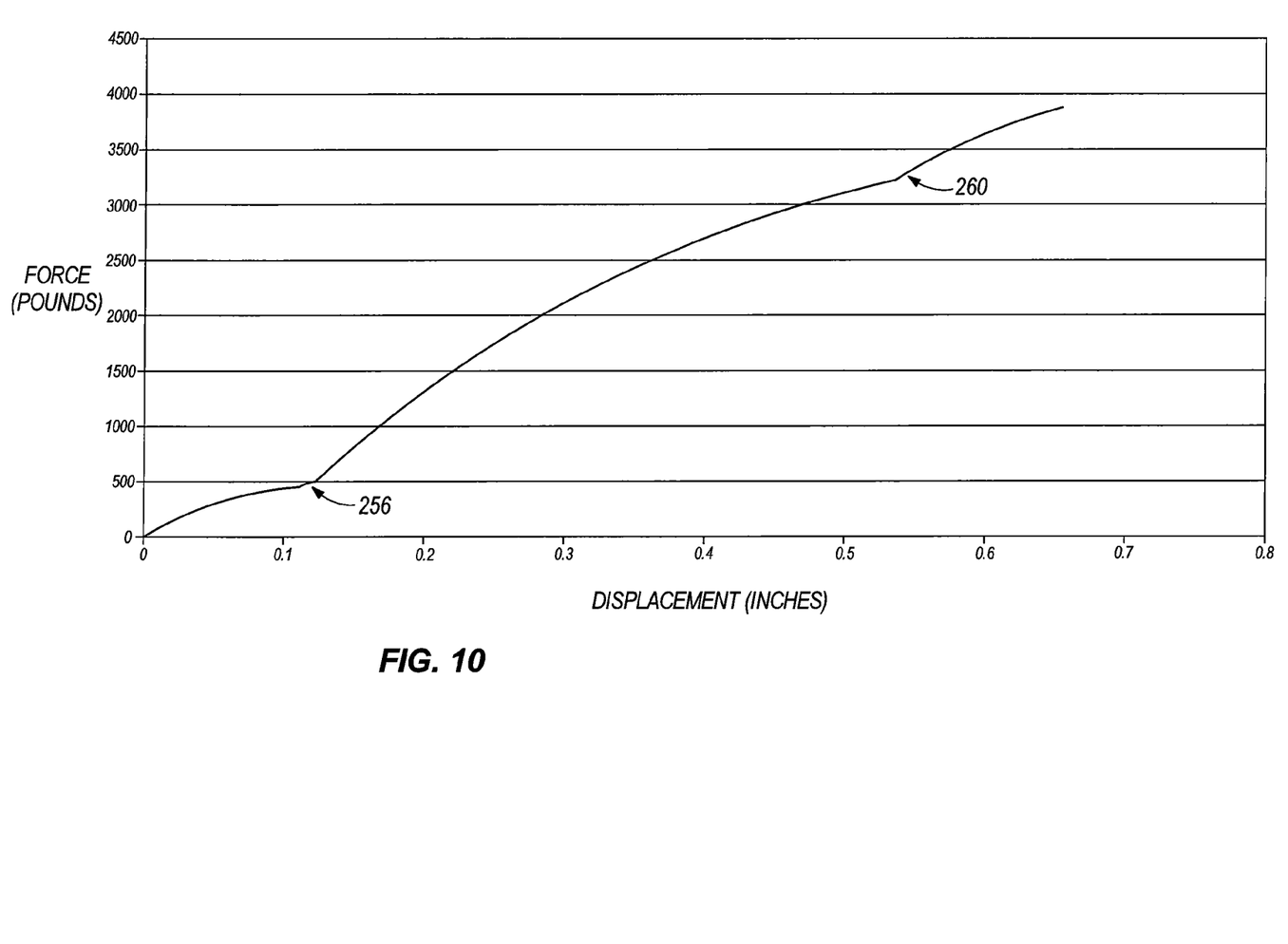
FIG. 10 is a graph illustrating the performance of a spring pack in the compensator assembly of FIG. 2.

Furthermore, the configuration of the spring pack 120 provides a graduated resistance characteristic as shown in FIG. 10. At initial displacement up to point 256 (about 0.12 inches), the force provided by the spring pack 120 corresponds to deflection of the pre-load spring 132, which can provide a biasing force up to nearly 500 pounds (the pre-load is set between about 300 pounds and about 500 pounds). The small pre-load spring 132 allows the pre-load in the compensator assembly 58 to be precisely controlled at a low level while the compensator assembly 58 is operable to provide a large operating range with a biasing force in the spring pack 120 at maximum compensation that is several times as large as the pre-load force. Too little pre-load can result in ineffective low speed performance and an abrupt engagement in the compensator assembly 58. If the preload is too high, the compensator assembly 58 is overly rigid at lower speeds and may lead to increased noise at idle.

Between point 256 and point 260 (from about 0.12 inches of deflection to about 0.54 inches of deflection) shown in FIG. 10, a second distinguishable portion of the reaction force is primarily attributable to deflection in the second springs 128. Beyond a deflection of about 0.54 inches (at point 260), a third distinguishable portion of the reaction force is primarily attributable to deflection in the first springs 124. At maximum compensation, the spring pack 120 of the compensator assembly 58 provides a biasing force of about 3875 pounds with an overall deflection of about 0.66 inches.

There are various constructions and combinations of spring quantities and dimensions that can be configured to perform in this general manner. For example, the second springs 128 can have a larger outer diameter (substantially similar to the outer diameter of the first springs 124) than that shown in the illustrated embodiment. The larger outer diameter makes the spring pack 120 less stiff overall, which can be counteracted by increasing the thickness of the first and/or second springs 124, 128. Clearance between the second springs 128 and the chain (not shown) that engages the sprocket teeth 142 increases as the outer diameter of the second springs 128 decreases.

Furthermore, the torque dampening characteristics of the compensator assembly 58 can be altered by replacing the cam slider 118 without changing or replacing the sprocket 140. A different cam slider having cam members or cam profiles configured differently from the cam profiles 204, 208 in the illustrated embodiment provides for easily tunable performance (e.g., particularly suited for a different engine, engine output, etc.). Because the spokes 152 have a generally simple cam follower surface 224, the sprocket 140 is compatible with a plethora of different cam members or cam profiles. Thus, the compensator assembly 58 provides multiple performance characteristics with a common sprocket 140.

Various features and advantages of the invention are set forth in the following claims.

What is claimed is:

1. A compensator assembly for transmitting torque from a crankshaft of an engine to a clutch in a motorcycle drive train, the compensator assembly comprising:
   a cam slider mounted on a first end of the crankshaft, the cam slider being configured to rotate with the crankshaft about a crankshaft axis;
   a sprocket mounted on the first end of the crankshaft adjacent the cam slider, wherein the sprocket is rotatable relative to the crankshaft and the cam slider about the crankshaft axis;
   a first spring mounted on a first side of the cam slider opposite the sprocket, the first spring being operable to bias the cam slider toward the sprocket; and
   a second spring mounted on the first side of the cam slider, the second spring being operable to bias the cam slider toward the sprocket, wherein the second spring has a spring rate substantially lower than a spring rate of the first spring.

2. The compensator assembly of claim 1, further comprising a third spring mounted on the first side of the cam slider, the spring being operable to bias the cam slider toward the sprocket, wherein the third spring has a spring rate substantially lower than the spring rate of the second spring.

3. The compensator assembly of claim 2, wherein the third spring is operable as a pre-load spring to provide a desired amount of axial pre-load to the compensator assembly with no substantial deflection of the first spring and no substantial deflection of the second spring.

4. The compensator assembly of claim 2, wherein the first spring has a first outer diameter and the second spring has a second outer diameter smaller than the first outer diameter.

5. The compensator assembly of claim 4, wherein the third spring has a third outer diameter smaller than the second outer diameter.

6. The compensator assembly of claim 2, further comprising a collar coupled to the first end of the crankshaft and operable to rotate with the crankshaft, the collar having an outer surface on which the first spring, the second spring, and the third spring are supported at the respective inner diameters of the first spring, the second spring, and the third spring.

7. The compensator assembly of claim 6, wherein the collar is formed with spline teeth configured to engage the cam slider for synchronous rotation with the crankshaft, the spline teeth forming a segmented outermost circumferential surface on which the first spring, the second spring, and the third spring are supported at their respective inner diameters.

8. A compensator assembly for transmitting torque from a crankshaft of an engine to a clutch in a motorcycle drive train, the compensator assembly comprising:
   a cam slider mounted on a first end of the crankshaft, the cam slider including a pair of cam members and being configured to rotate with the crankshaft about a crankshaft axis;
   a sprocket mounted on the first end of the crankshaft adjacent the cam slider, the sprocket including a cam member engageable by the pair of cam members of the cam slider, wherein the sprocket is rotatable relative to the crankshaft and the cam slider about the crankshaft axis; and
   at least one spring mounted on a first side of the cam slider opposite the sprocket, the spring being operable to bias at least one of the pair of cam members of the cam slider into contact with the cam member of the sprocket;
   wherein the pair of cam members includes a first cam member operable to transmit torque from the crankshaft to the clutch and a second cam member, dissimilar from the first cam member, operable to transmit torque from the clutch to the crankshaft.

9. The compensator assembly of claim 8, wherein the first cam member terminates at a peak defining a height measured from a base surface of the cam slider.

10. The compensator assembly of claim 9, wherein the first cam member is defined along a first circumferential segment of the cam slider between the base surface and the peak, and the second cam member is defined along a second circumferential segment from the base surface to another peak of the cam slider.

11. The compensator assembly of claim 10, wherein the first circumferential segment is formed over an angle of about 65 degrees about the crankshaft axis.

12. The compensator assembly of claim 11, wherein the second circumferential segment is formed over an angle of about 55 degrees about the crankshaft axis.

13. The compensator assembly of claim 9, wherein the peak forms an edge generally oriented along a radius of the cam slider, the edge having a radially outer end substantially further above the base surface than a radially inner end.

14. The compensator assembly of claim 8, wherein the cam member of the sprocket is a spoke.

15. The compensator assembly of claim 14, wherein the cam slider includes two additional pairs of cam members and the sprocket includes two additional spokes.

16. The compensator assembly of claim 8, wherein the sprocket is substantially fixed in the axial direction so that the cam slider is operable to move along the crankshaft axis against the bias of the at least one spring upon contact between the cam member of the sprocket and any one of the first cam member and the second cam member of the cam slider.

17. A compensator assembly for transmitting torque from a crankshaft of an engine to a clutch in a motorcycle drive train, the compensator assembly comprising:
   a cam slider mounted on a first end of the crankshaft, the cam slider being configured to rotate with the crankshaft about a crankshaft axis;
   a sprocket mounted on the first end of the crankshaft adjacent the cam slider, the sprocket being engageable by the cam slider, wherein the sprocket is rotatable relative to the crankshaft and the cam slider;
   a spring pack mounted on a first side of the cam slider opposite the sprocket, the spring pack being operable to bias the cam slider toward the sprocket;
   a retainer configured to be coupled to the crankshaft to rotate therewith, the retainer being formed with an anti-rotation feature;
   a bolt configured to pass through the retainer and engage the crankshaft, wherein the anti-rotation feature of the retainer is engageable to hold the retainer, the cam slider, and the crankshaft stationary during tightening of the bolt; and
   a collar having an interior spline surface coupled to an exterior spline surface on the first end of the crankshaft, wherein the retainer includes an external spline surface coupled to the interior spline surface of the collar.

18. The compensator assembly of claim 17, wherein the anti-rotation feature is a hexagonal boss sized to fit a standard wrench size.

19. The compensator assembly of claim 17, wherein a pre-load in the spring pack is set as the bolt is torqued without interference due to cam engagement between the sprocket and the cam slider.

20. A compensator assembly for transmitting torque from a crankshaft of an engine to a clutch in a motorcycle drive train, the compensator assembly comprising:
a cam slider mounted on a first end of the crankshaft, the cam slider including a cam member extending between a peak and a base surface, the cam slider being configured to rotate with the crankshaft about a crankshaft axis;
a sprocket mounted on the first end of the crankshaft adjacent the cam slider, the sprocket including a plurality of spokes, wherein one of the plurality of spokes engages the cam member of the cam slider, the sprocket further including a plurality of axial openings, wherein the peak extends through one of the plurality of axial openings; and
at least one spring mounted on a first side of the cam slider opposite the sprocket, the at least one spring being operable to bias the cam slider toward the sprocket.

21. The compensator assembly of claim 20, wherein the cam slider is operable to move along the crankshaft axis toward the at least one spring when the one of the plurality of spokes engages the cam member of the cam slider.

22. The compensator assembly of claim 21, wherein the cam slider is operable to move toward the engine when the one of the plurality of spokes engages the cam member.

23. The compensator assembly of claim 20, further comprising a housing containing a quantity of lubricant, wherein the cam member is exposed to a portion of the quantity of lubricant through the axial openings.

24. The compensator assembly of claim 20, wherein the peak extends through one of the plurality of axial openings when one of the plurality of spokes is positioned adjacent the base surface.

* * * * *